United States Patent
Abernathy et al.

(10) Patent No.: US 7,401,242 B2
(45) Date of Patent: Jul. 15, 2008

(54) DYNAMIC POWER MANAGEMENT IN A PROCESSOR DESIGN

(75) Inventors: Christopher Michael Abernathy, Austin, TX (US); Jonathan James DeMent, Austin, TX (US); Ronald Hall, Cedar Park, TX (US); Robert Alan Philhower, Valley Cottage, NY (US); David Shippy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 11/236,657

(22) Filed: Sep. 27, 2005

(65) Prior Publication Data

US 2007/0074059 A1   Mar. 29, 2007

(51) Int. Cl.
*G06F 1/00* (2006.01)
*G06F 1/26* (2006.01)
*G06F 1/32* (2006.01)

(52) U.S. Cl. .................. 713/320; 713/300; 713/322; 713/324

(58) Field of Classification Search ................ 713/300, 713/320, 322, 324
See application file for complete search history.

(56) References Cited

U.S. PATENT DOCUMENTS 5,203,003 A * 4/1993 Donner .................. 713/322
5,918,042 A * 6/1999 Furber .................... 713/600
6,247,134 B1 * 6/2001 Sproch et al. ............. 713/320
6,513,057 B1 * 1/2003 McCrory .................. 718/102
6,609,209 B1 * 8/2003 Tiwari et al. .............. 713/322
6,611,920 B1 * 8/2003 Fletcher et al. ............ 713/322
6,636,976 B1 * 10/2003 Grochowski et al. ....... 713/320
6,906,554 B1 * 6/2005 Chen ........................ 326/93
6,948,050 B1 * 9/2005 Gove et al. ................. 712/35
7,266,708 B2 * 9/2007 Miller ....................... 713/300
2002/0138777 A1 * 9/2002 Feierbach .................. 713/324
2004/0068640 A1 * 4/2004 Jacobson et al. ........... 712/220

* cited by examiner

*Primary Examiner*—Thomas Lee
*Assistant Examiner*—Ji H Bae
(74) *Attorney, Agent, or Firm*—VanLeeuwen & VanLeeuwen; D'Ann N. Rifai

(57) ABSTRACT

A pipeline stage's stall detection logic detects a stall condition, and sends a signal to idle detection logic to gate off the pipeline's register clocks. The stall detection logic also monitors a downstream pipeline stage's stall condition, and instructs the idle detection logic to gate off the pipeline stage's registers when the downstream pipeline stage is in a stall condition as well. In addition, when the pipeline stage's stall detection logic detects a stall condition, either from the downstream pipeline stage or from its own pipeline units, the pipeline stage's stall detection logic informs an upstream pipeline stage to gate off its clocks and thus, conserve more power.

7 Claims, 7 Drawing Sheets

DYNAMIC POWER MANAGEMENT IN A PROCESSOR DESIGN

BACKGROUND OF THE INVENTION

1. Technical Field

The present invention relates to a system and method for dynamic power management in a processor design. More particularly, the present invention relates to a system and method for using a stall condition to instruct idle detection logic to gate off register clocks within a pipeline stage in order to conserve power.

2. Description of the Related Art

Computer system designs incorporate a multitude of design approaches in order to achieve maximum performance. Once such design approach is pipelining. A pipeline is an implementation technique whereby multiple instructions are overlapped in execution. Pipelines may be segmented into "stages," whereby each stage includes one or more instruction units or execution units. A pipeline stage includes a "stall point," which is a location in the pipeline that checks for a stall condition. For example, a pipeline stage may include an issue unit, whereby the issue unit checks for stalls that correspond to an instruction waiting to issue.

Pipeline stall conditions result from a variety of reasons, such as executing a non-pipeline instruction, entering single-step mode, executing a de-normalization instruction, or identifying a data hazard. Stall conditions drive a corresponding pipeline stage into a stall state, and many of these stall conditions may last for an extended period of time.

Some processor designs incorporate software and hardware power management techniques to control pipeline stages. An example of software power management is for software to program a processor to switch from full power mode to sleep mode or slow mode. An example of hardware power management is to disable an individual pipeline when it is in an idle state. A challenge found, however, is that when a pipeline stage stalls, the pipeline is still considered an "active" pipeline and, therefore, neither software nor hardware power management gates off the pipeline's clocks.

What is needed, therefore, is a system and method to efficiently conserve power when a pipeline stage detects a stall condition.

SUMMARY

It has been discovered that the aforementioned challenges are resolved using a system and method for using a stall condition to instruct idle detection logic to gate off register clocks within a pipeline stage in order to conserve power. The stall condition also propagates up the pipeline to upstream pipeline stages in order for the upstream pipeline stage to gate off their clocks as well.

A pipeline includes multiple pipeline "stages," whereby each stage includes one or more instruction units or execution units. Each pipeline stage includes stall detection logic, idle detection logic, and pipeline units, such as instruction units or execution units. A pipeline stage's stall detection logic and idle detection logic may be incorporated into the pipeline stage's pipeline units, or may be stand-alone detection logic. The stall detection logic detects stall conditions within the pipeline units, and the idle detection logic detects idle conditions within the pipeline units.

When a pipeline stage's idle detection logic detects an idle condition, it sends an idle signal to its pipeline units that, in turn, gate off clocks to their registers. When the pipeline stage's stall detection logic detects a stall condition from either a downstream pipeline stage or its pipeline stage, the stall detection logic sends a signal to the pipeline stage's idle detection logic that, in turn, instructs the idle detection logic to send a signal to gate off the register clocks. In addition, the stall detection logic propagates the stall signal to upstream pipeline stages that, in turn, instruct their idle detection logic to gate off register clocks.

In one embodiment, when stall detection logic detects a stall condition, the stall detection logic allows corresponding upstream pipeline stages to issue instructions for a few cycles after the stall condition is detected in order to fill a pipeline stage.

In another embodiment, if a processor design incorporates stall detection to gate off clocks as a hardware power management mechanism, the processor may use an idle condition to instruct the stall detection logic to gate off clocks during idle conditions. Instead of gating off clocks at a pipeline stage and an upstream pipeline stage, such as with the stall condition, the idle condition instructs the stall detection logic to gate off the particular pipeline stage's clocks.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
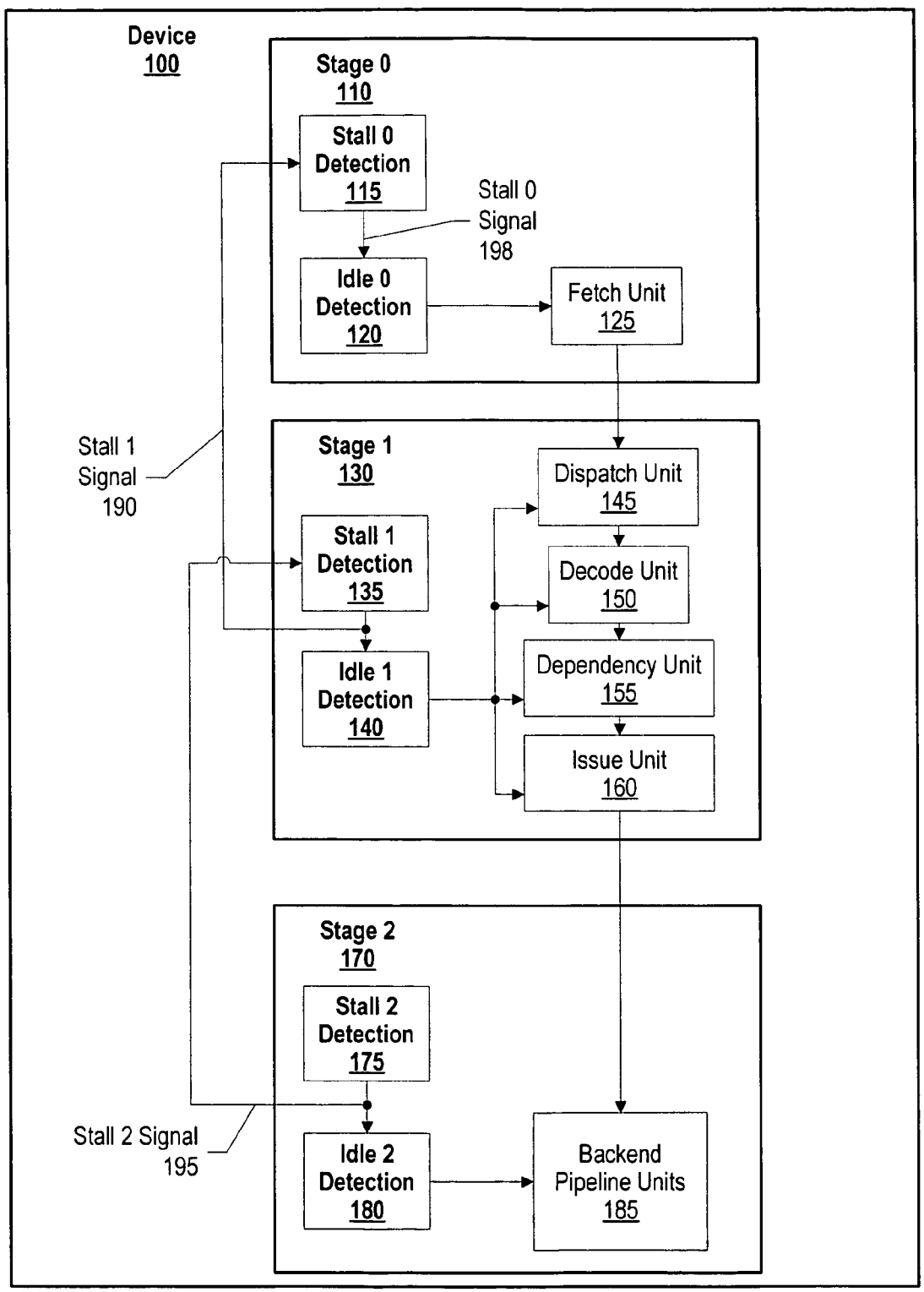
FIG. 1 is a diagram showing pipeline stages gating off clocks to pipeline units and propagating a stall signal to upstream pipeline stages.

FIG. 1 is a diagram showing pipeline stages gating off clocks to pipeline units (e.g. instruction units and execution units) and propagating a stall signal to upstream pipeline stages. A designer segments a pipeline into "stages" by including stall and idle detection points at places within the pipeline that detect whether the pipeline is stalled or idle. Device 100 includes stage 0 110, stage 1 130, and stage 2 170. Each stage includes one or more pipeline units, and each pipeline unit includes multiple registers (see FIG. 2 and corresponding text for further details regarding pipeline unit registers).

Stage 2 170 includes stall 2 detection 175, idle 2 detection 180, and backend pipeline units 185. Stall 2 detection 175 and idle 2 detection 180 may be incorporated into backend pipeline units 185, or may be stand alone detection logic as shown. Stall 2 detection 175 detects stall conditions within backend pipeline units 185, and idle 2 detection 180 detects idle conditions within backend pipeline units 185 (see FIGS. 4, 5, and corresponding text for further details regarding stall conditions and idle conditions). Backend pipeline units 185 include execution units, such as a fixed-point unit and a floating-point unit.

When idle 2 detection 180 detects an idle condition, idle 2 detection 180 sends an idle signal to backend pipeline units 185 that gates off clocks to the registers within backend pipeline 185. When stall 2 detection 175 detects a stall condition, stall 2 detection 175 activates stall 2 signal 195 that instructs idle 2 detection 180 to gate off clocks to backend pipeline 185's registers. In addition, stall 2 detection 175 sends stall 2 signal 195 to an upstream pipeline stage (stage 1 130), which instructs the upstream pipeline stage to gate off its clocks as well.

Stage 1 130 includes stall 1 detection 135, idle 1 detection 140, and instruction units, which are dispatch unit 145, decode unit 150, dependency unit 155, and issue unit 160. Stall 1 detection 135 and idle 1 detection 140 may be incorporated into the instruction units, or may be stand alone detection logic as shown. Stall 1 detection 135 and idle 1 detection 140 detects stall and idle conditions, respectively, within the instruction units (see FIGS. 4, 5, and corresponding text for further details regarding stall conditions and idle conditions).

When idle 1 detection 140 detects an idle condition, idle 1 detection 140 sends an idle signal to the instruction units that gates off their register clocks.

When stall 1 detection 135 detects a stall condition or detects that stall 2 signal 195 is active, stall 1 detection 135 activates stall 1 signal 190 that instructs idle 1 detection 140 to gate off clocks to the instruction registers. In addition, stall 1 detection 135 sends stall 1 signal 190 to its upstream pipeline stage (stage 0 110), which instructs the upstream pipeline stage to gate off its clocks as well.

Stage 0 110 includes stall 0 detection 115, idle 0 detection 120, and fetch unit 125. Stall 0 detection 115 and idle 0 detection 120 may be incorporated into fetch unit 125, or may be stand alone detection Logic as shown.

Figure 4:
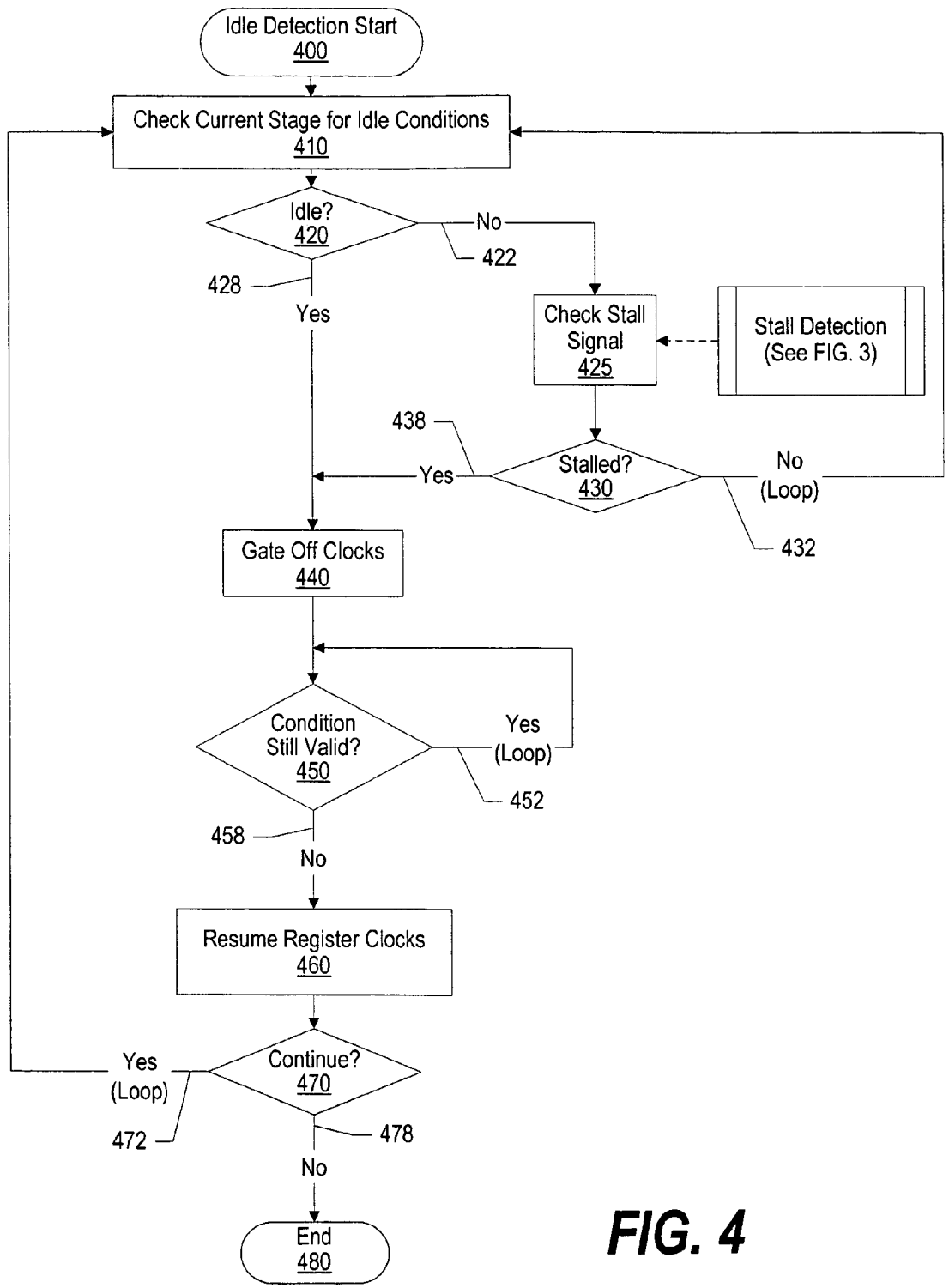
FIG. 4 is a flowchart showing steps taken in checking a pipeline stage for idle conditions and a stall signal received from the stall detection logic.
Figure 5:
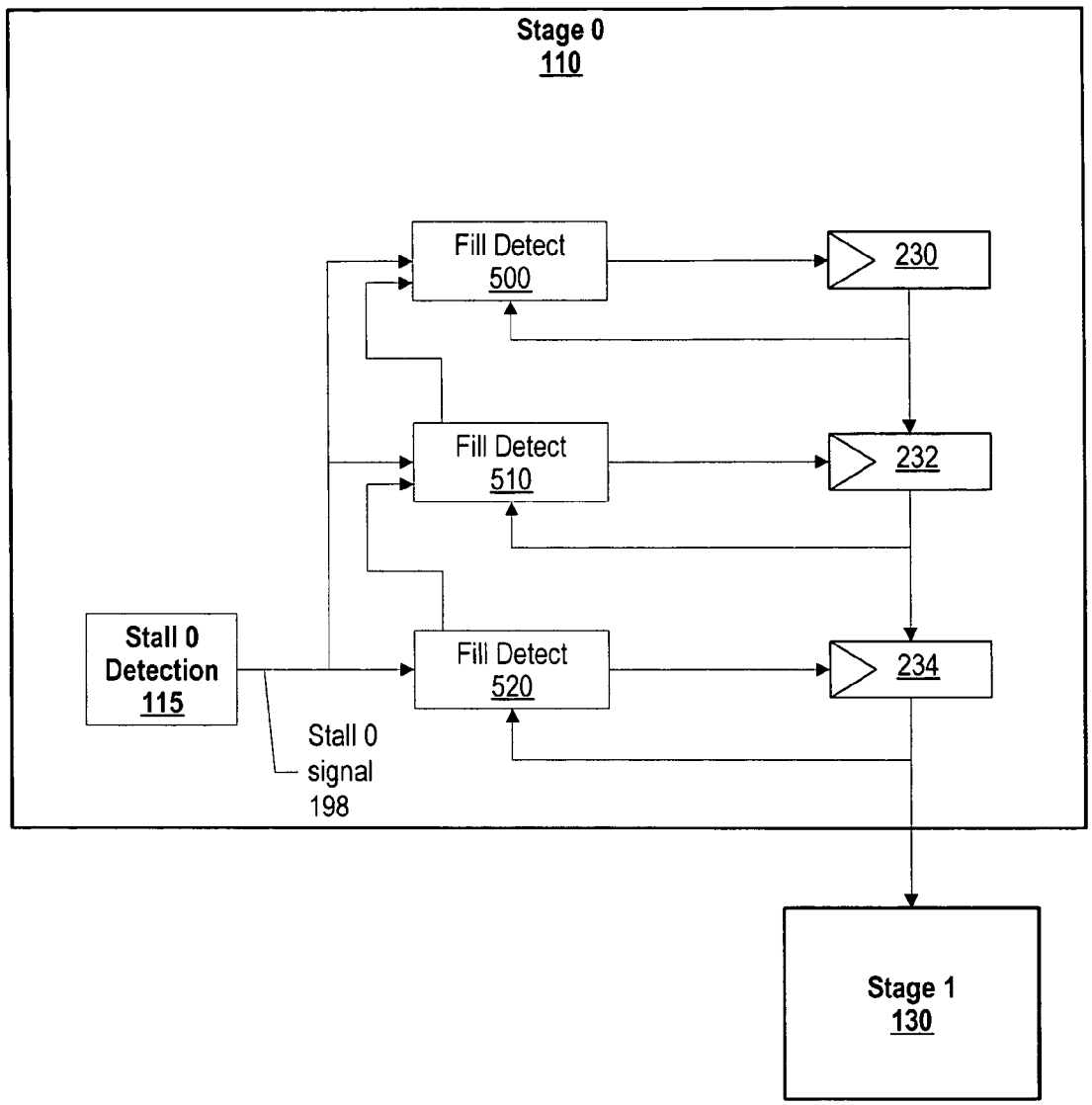
FIG. 5 is a diagram showing a pipeline stage loading pipeline registers before gating off the registers' corresponding clock.

Stall 0 detection 115 and idle 0 detection 120 detects stall and idle conditions, respectively, within fetch unit 125 (see FIGS. 4, 5, and corresponding text for further details regarding stall conditions and idle conditions).

When idle 0 detection 120 detects an idle condition, idle 0 detection 120 sends an idle signal to fetch unit 125 to gate off register clocks. When stall 0 detection 115 detects a stall condition or detects that stall 1 signal 190 is active, stall 0 detection 115 activates stall 0 signal 198 that instructs idle 0 detection 120 to gate off clocks to fetch unit 125.

As can be seen, when a pipeline stage detects a stall signal from a downstream pipeline stage, the pipeline stage gates off its own clocks, and propagates the stall signal back to an upstream pipeline stage. In one embodiment, when stall detection logic detects a stall condition, the stall detection logic allows corresponding upstream pipeline stages to issue instructions within a few cycles after the stall condition is detected, which may result in a full pipeline (see FIG. 5 and corresponding text for further details).

In another embodiment, if a processor design incorporates stall detection to gate off clocks as a hardware power management mechanism, the processor may use an idle condition to instruct the stall detection logic to gate off clocks during idle conditions. Instead of gating off clocks at a pipeline stage and an upstream pipeline stage, such as with the stall condition, the idle condition instructs the stall detection logic to gate off the particular pipeline stage's clocks. Idle conditions may be the result from a flush condition, an unavailable resource condition, a disabled thread condition, and a disabled processor condition.

Figure 2:
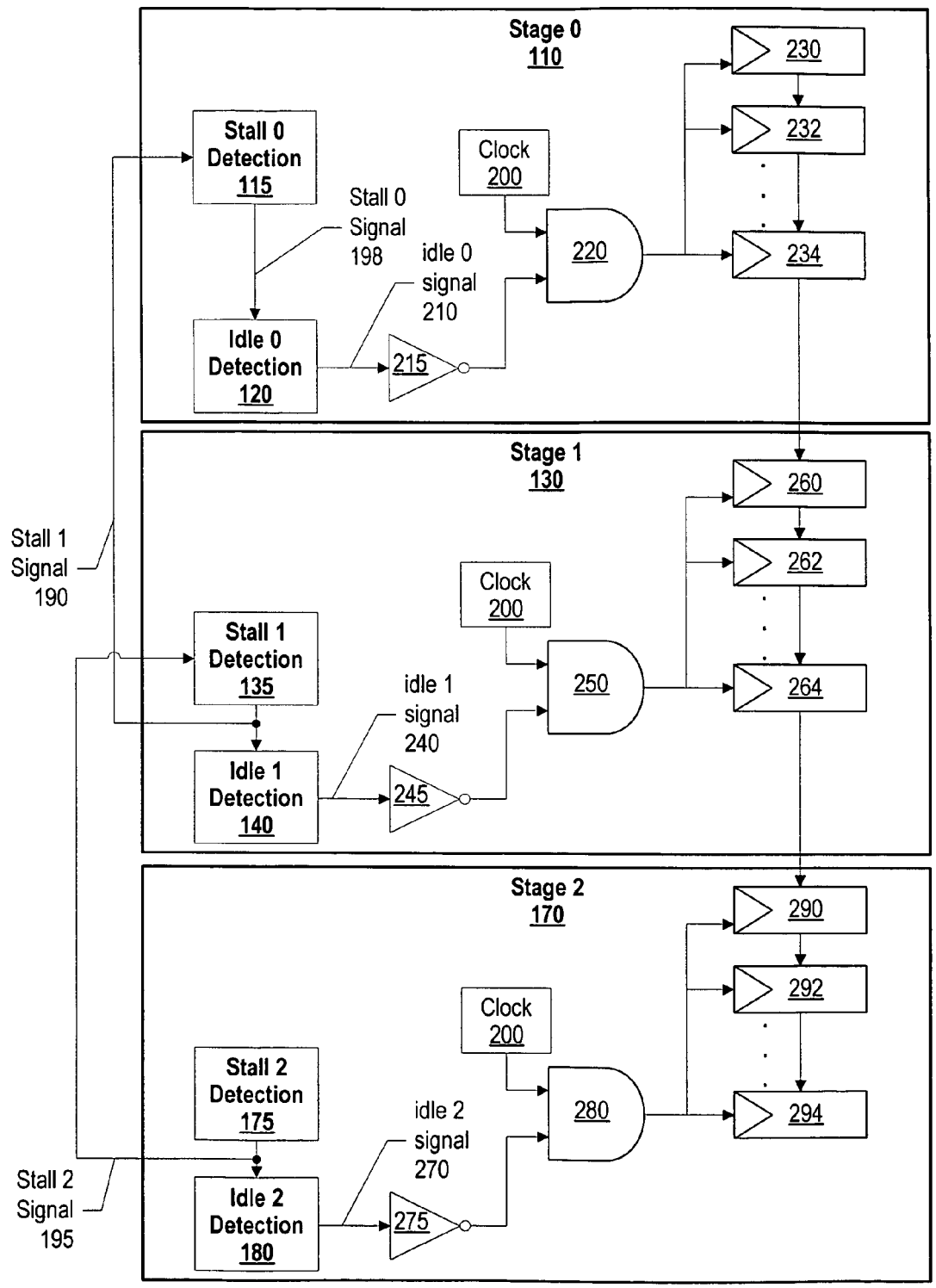
FIG. 2 is a diagram showing idle detection logic gating off clocks during idle conditions, and stall detection logic instruction the idle detection logic to gate off clocks during stall conditions.

FIG. 2 is a diagram showing idle detection logic gating off clocks during idle conditions, and stall detection logic instruction the idle detection logic to gate off clocks during stall conditions. When a pipeline stage detects an idle condition, the pipeline stage gates off clocks for registers that are included in the pipeline stage. When a pipeline stage detects a stall condition, the pipeline stage sends a signal to the idle detection logic to gate off clocks, and also sends a stall signal to an upstream pipeline stage that instructs the upstream pipeline stage to gate off its clocks as well.

Stage 2 170 includes stall 2 detection 175 and idle 2 detection 180, which are the same as that shown in FIG. 1. Stage 2 170 also includes registers 290-294 that are part of a device's pipeline. Registers 290-294 are clocked by clock 200, which feeds through gate 280. When idle 2 detection 180 does not detect an idle condition, idle 2 signal 270 is low, which makes the output of gate 275 high. When the output of gate 275 is high, clock 280 feeds through gate 280 and clocks registers 290-294. However, when idle 2 detection 180 detects an idle condition, idle 2 signal 270 is high, which inverts through gate 275 and gates off clock 200 to registers 290-294 using gate 280.

When stall 2 detection 175 detects a stall condition, stall 2 detection 175 activates stall 2 signal 195, which instructs idle 2 detection 180 to activate idle 2 signal 270, thus gating off clock 200 to registers 290-294. In addition, stall 2 detection 175 sends stall 2 signal 195 to stall 1 detection 135 located in stage 1 130.

When stall 1 detection 135 detects stall 2 signal 195 high, or detects a stall condition in stage 1 130, stall 1 detection 135 activates stall 1 signal 190, which is sent to stall 0 detection 115 and also instructs idle 1 detection 140 to activate idle 1 signal 240. Idle 1 signal 240 inverts through gate 245 and gates off clock 200 to registers 260-264 using gate 250. In addition, when idle 1 detection 140 detects an idle condition in stage 1 130, idle 1 detection 140 activates idle 1 signal 240 to gate off clock 200 to registers 260-264 as well. Stage 1 130, stall 1 detection 135, and idle 1 detection 140 are the same as that shown in FIG. 1.

When stall 0 detection 115 detects stall 1 signal 190 high, or detects a stall condition in stage 0 110, stall 0 detection 115 activates stall 0 signal 198, which instructs idle 0 detection 120 to activate idle 0 signal 210. Idle 0 signal 210 inverts through gate 215 and gates off clock 200 to registers 230-234 using gate 220. In addition, when idle 0 detection 120 detects an idle condition in stage 0 110, idle 0 detection 120 activates idle 0 signal 210 to gate off clock 200 to registers 230-234 as well. Stage 0 110, stall 0 detection 115, and idle 0 detection 120 are the same as that shown in FIG. 1.

Figure 3:
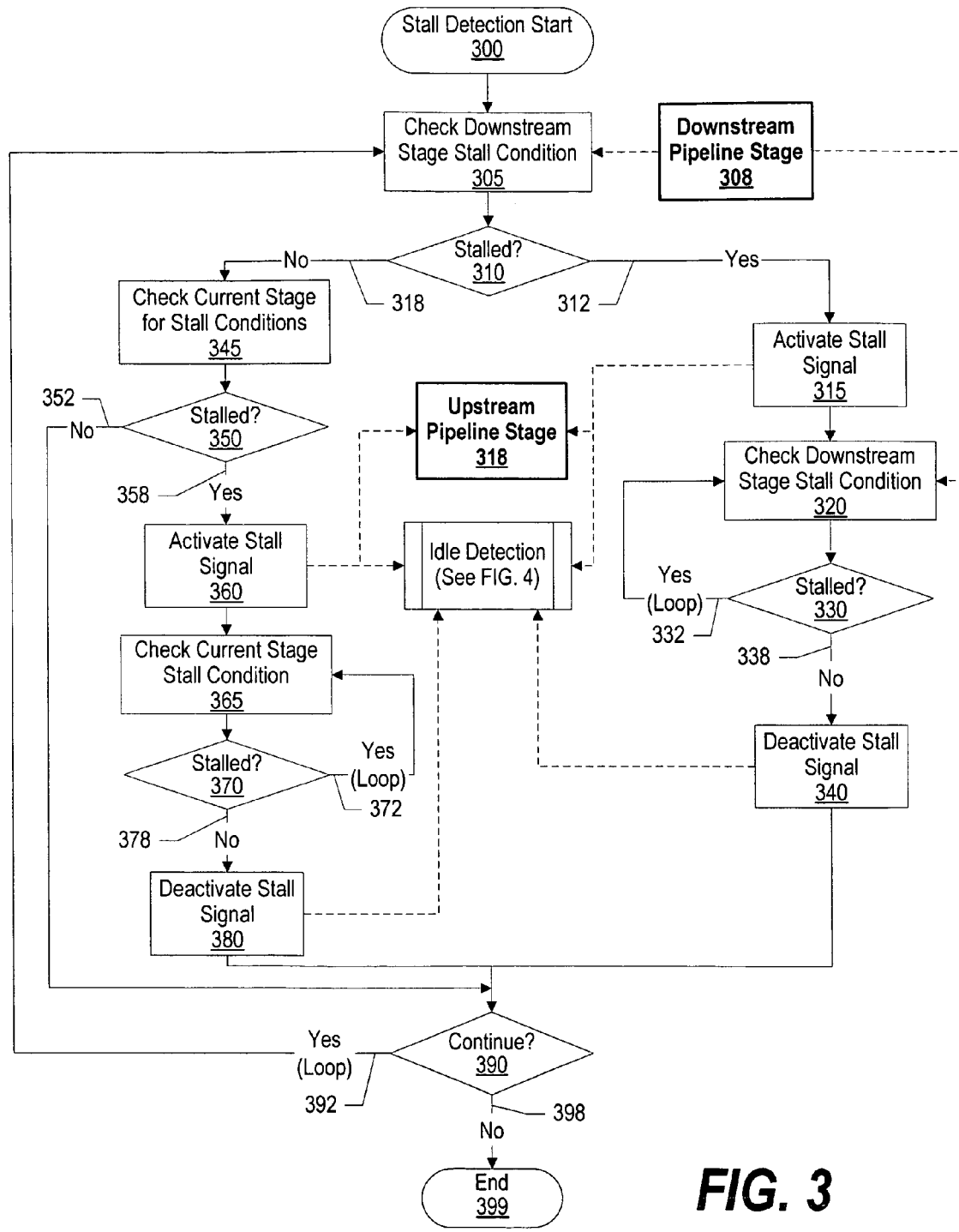
FIG. 3 is a flowchart showing steps taken in detecting pipeline stage stall conditions and instructing idle detection logic to gate off register clocks.

FIG. 3 is a flowchart showing steps taken in detecting pipeline stage stall conditions and instructing idle detection logic to gate off register clocks. In the event that a pipeline stage detects a stall condition, the pipeline stage sends a signal to idle detection logic to gate off clocks, and also sends the stall signal to an upstream pipeline stage, which instructs the upstream pipeline stage to gate off its clocks as well.

Processing commences at 300, whereupon the pipeline stage checks the stall condition of downstream pipeline stage 308 (step 305). Downstream pipeline stage 308 is the stage after the pipeline stage in question, and provides a stall signal to the pipeline stage that identifies whether downstream pipeline stage 308 is stalled (see FIGS. 1, 2, and corresponding text for further details regarding stall signal propagation).

A determination is made as to whether downstream pipeline stage 308 is in a stalled state (decision 310). A stalled state may result from situations such as:

1) ERAT miss: When a processor's fetch unit encounters an ERAT miss, and stops fetching instructions until the translation for the ERAT miss is put into the ERAT.
2) Cache miss: When a fetch unit misses an instruction in the instruction cache, and stops fetching until the fetch data returns from secondary memory.
3) Data dependency: When a decode unit identifies an instruction's source registers match with older instructions that are still outstanding, and stops issuing the instruction until the depended data is available.
4) Non-pipeline instructions: Some floating-point instructions are non-pipeline instructions, which stall the pipeline when there is a floating-point instruction that is next to issue.
5) Context synchronizing instruction (CSI): CSI instructions, such as "Sync," stall the pipeline until older instructions are complete.

If the pipeline detects that downstream pipeline stage 308 is stalled, decision 310 branches to "Yes" branch 312 whereupon the stall detection logic activates a stall signal that is sent to idle detection logic and upstream pipeline stage 318 (step 315). In turn, the idle detection logic gates off clocks for the current stage (see FIG. 4 and corresponding text for further details regarding idle detection processing). The pipeline stage checks downstream pipeline stage 308's stall condition at step 320, and a determination is made as to whether downstream pipeline stage 308 is still stalled (decision 330). If downstream pipeline stage 308 is still stalled, decision 330 branches to "Yes" branch 332 which loops back to continue to check downstream pipeline stage 308's stall condition. This looping continues until downstream pipeline stage 308 comes out of the stalled state, at which point decision 330 branches to "No" branch 338 whereupon the stall signal deactivates (step 340), which instructs the idle detection logic to resume clocks to the pipeline stage's registers.

On the other hand, if the pipeline stage detects that downstream pipeline stage 308 is not in a stalled state at decision 310, decision 310 branches to "No" branch 318 whereupon the pipeline stage checks whether the pipeline stage itself has a stall condition, such as one of the stall conditions discussed above (step 345). A determination is made as to whether the pipeline stage detected a stall condition within its own stage (decision 350). If the pipeline stage did not detect a stall condition, decision 350 branches to "No" branch 352 bypassing stalling state steps.

On the other hand, if the pipeline stage detected a stall condition, decision 350 branches to "Yes" branch 358 whereupon the pipeline stage activates the stall signal that to idle detection logic and upstream pipeline stage 318 (step 360). In turn, the idle detection logic gates off clocks for the current stage (see FIG. 4 and corresponding text for further details regarding idle detection processing).

At step 365, the pipeline stage checks its stall condition, and a determination is made as to whether the pipeline stage is still stalled (decision 370). If the pipeline stage is still stalled, decision 370 branches to "Yes" branch 372, which loops back to continue to monitor the pipeline stage's stall condition. This looping continues until the pipeline stage comes out of the stalled state, at which point decision 370 branches to "No" branch 378 whereupon the pipeline stage resets its stall signal and thus, the idle detection logic resumes clocks to the current stage.

A determination is made as to whether to continue checking for stall conditions (decision 390). If the pipeline stage should continue to check for stall conditions, decision 390 branches to "Yes" branch 392, which loops back to check for stall conditions. This looping continues until the pipeline stage should stop checking for stall conditions, at which point decision 390 branches to "No" branch 398 whereupon processing ends at 399.

FIG. 4 is a flowchart showing steps taken in checking a pipeline stage for idle conditions and a stall signal received from the stall detection logic. In the event that a pipeline detects an idle condition or a stall condition, the pipeline gates off register clocks in order to conserve power consumption.

Processing commences at 400, whereupon processing checks the pipeline stage for an idle condition at step 410. A reason that a pipeline is idle may be 1) due to a flush, 2) due to the program flow, or 3) due to quiesce. When a flush occurs (fetch error, branch mispredict, etc.), the pipeline flushes all the instructions from a flush point and above. The result is that the pipeline becomes idle until instructions are re-fetched and re-entered into the pipeline. Regarding program flow, a processor may have multiple fix-point and floating-point pipelines. When a program does not take advantage of all the pipelines, some pipelines are active, while other pipelines are idle at any given time. Regarding the pipeline being idle due to quiesce, in a multiprocessor single chip design, if one of the processor is active and the rest of the processors are in quiesce, the processors that are in quiesce are idle.

A determination is made as to whether the pipeline stage is in an idle stage (decision 420). If the pipeline stage is in an idle state, decision 420 branches to "Yes" branch 428 whereupon processing gates off register clocks at step 440. On the other hand, if the pipeline stage is not in an idle stage, decision 420 branches to "No" branch 422 whereupon processing checks the state of a stall signal that is received from stall detection logic at step 425 (see FIG. 3 and corresponding text for further details regarding stall detection logic).

A determination is made as to whether the stall signal is active (decision 430). If the stall signal is not active, decision 430 branches to "No" branch 432 which loops back to continue to check for idle conditions. On the other hand, if the stall signal is active, decision 430 branches to "Yes" branch 438 whereupon processing gates off clocks at step 440.

A determination is made as to whether the detected condition (idle or stall) is still valid (decision 450). If the condition is still valid, decision 450 branches to "Yes" branch 452, which loops back and continues to check the condition. This looping continues until the condition is not valid, at which point decision 450 branches to "No" branch 458 whereupon processing resumes clocks to registers at step 460.

A determination is made as to whether to continue monitoring idle and stalled conditions (decision 470). If processing should continue to monitor idle and stall conditions, decision 470 branches to "Yes" branch 472, which loops back to continue to monitor conditions. This looping continues until processing should stop monitoring idle and stall conditions, at which point decision 470 branches to "No" branch 478 whereupon processing ends at 480.

FIG. 5 is a diagram showing a pipeline stage loading pipeline registers before gating off the registers' corresponding clock. In one embodiment, when a stall condition is detected, a pipeline stage loads each register before gating off its clock in order to fill up the pipeline.

FIG. 5 shows stage 0 110, stall 0 detection 115, and stage 1 130, which are the same as that shown in FIG. 1. Stage 0 110 includes stall 0 signal 198 and registers 230-234, which are the same as that shown in FIG. 2, and fill detections 500-520. When stall 0 detection 115 activates stall 0 signal 198 to gate off clocks to registers 230-234, fill detect 520 monitors register 234 and continues to clock register 234 until it loads an instruction, at which point fill detect 520 gates off the clock to register 234.

Fill detect 520 also sends a signal to fill detect 510 that informs fill detect 510 that register 234 is loaded. As such, fill detect 510 monitors register 232 and continues to clock register 232 until it loads an instruction, at which point fill detect 510 gates off the clock to register 232.

Fill detect 510 also sends a signal to fill detect 500 that informs fill detect 500 that register 232 is loaded. As such, fill detect 500 monitors register 230 and continues to clock register 230 until it loads an instruction, at which point fill detect 500 gates off the clock to register 230. As a result, each of registers 230-234 is loaded with an instruction prior to gating off their respective clocks.

Figure 6:
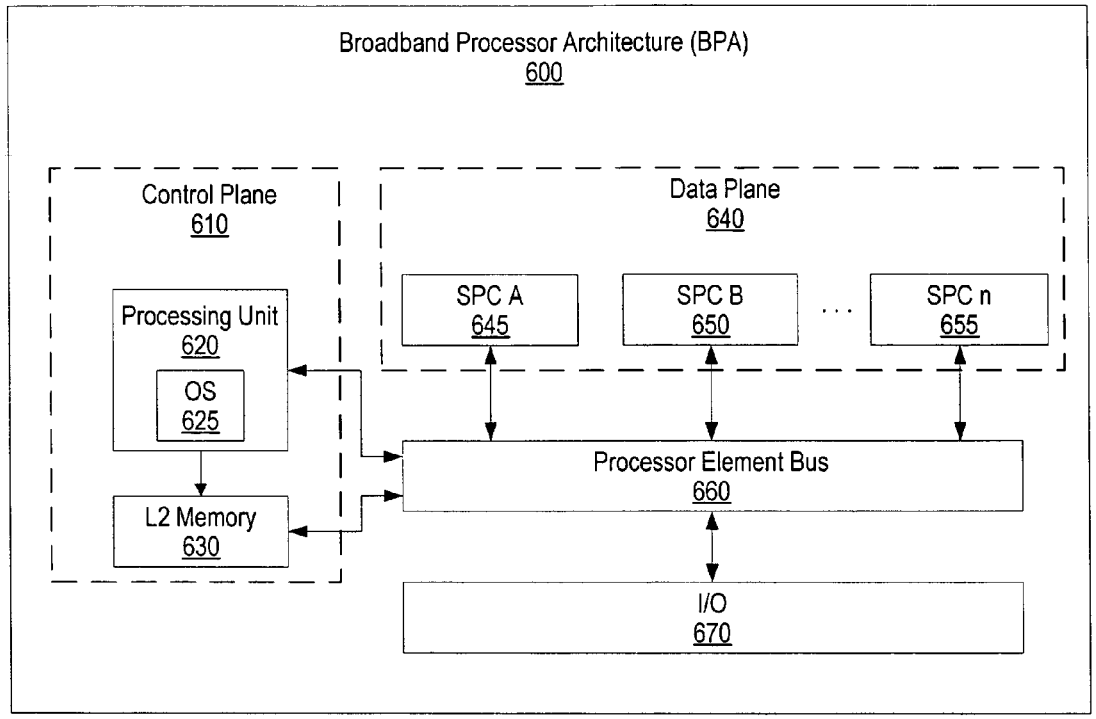
FIG. 6 is a block diagram of a computing device capable of implementing the present invention.

FIG. 6 illustrates an information handling system, which is a simplified example of a computer system capable of performing the computing operations described herein. Broadband processor architecture (BPA) 600 includes a plurality of heterogeneous processors, a common memory, and a common bus. The heterogeneous processors are processors with different instruction sets that share the common memory and the common bus. For example, one of the heterogeneous processors may be a digital signal processor and the other heterogeneous processor may be a microprocessor, both sharing the same memory space.

BPA 600 sends and receives information to/from external devices through input output 670, and distributes the information to control plane 610 and data plane 640 using processor element bus 660. Control plane 610 manages BPA 600 and distributes work to data plane 640.

Control plane 610 includes processing unit 620, which runs operating system (OS) 625. For example, processing unit 620 may be a Power PC core that is embedded in BPA 600 and OS 625 may be a Linux operating system. Processing unit 620 manages a common memory map table for BPA 600. The memory map table corresponds to memory locations included in BPA 600, such as L2 memory 630 as well as non-private memory included in data plane 640.

Data plane 640 includes Synergistic Processing Complex's (SPC) 645, 650, and 655. Each SPC is used to process data information and each SPC may have different instruction sets. For example, BPA 600 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU). An SPU is preferably a single instruction, multiple data (SIMD) processor, such as a digital signal processor, a microcontroller, a microprocessor, or a combination of these cores. In a preferred embodiment, each SPU includes a local memory, registers, four floating-point units, and four integer units. However, depending upon the processing power required, a greater or lesser number of floating points units and integer units may be employed.

SPC 645, 650, and 655 are connected to processor element bus 660, which passes information between control plane 610, data plane 640, and input/output 670. Bus 660 is an on-chip coherent multi-processor bus that passes information between I/O 670, control plane 610, and data plane 640. Input/output 670 includes flexible input-output logic, which dynamically assigns interface pins to input output controllers based upon peripheral devices that are connected to BPA 600.

Figure 7:
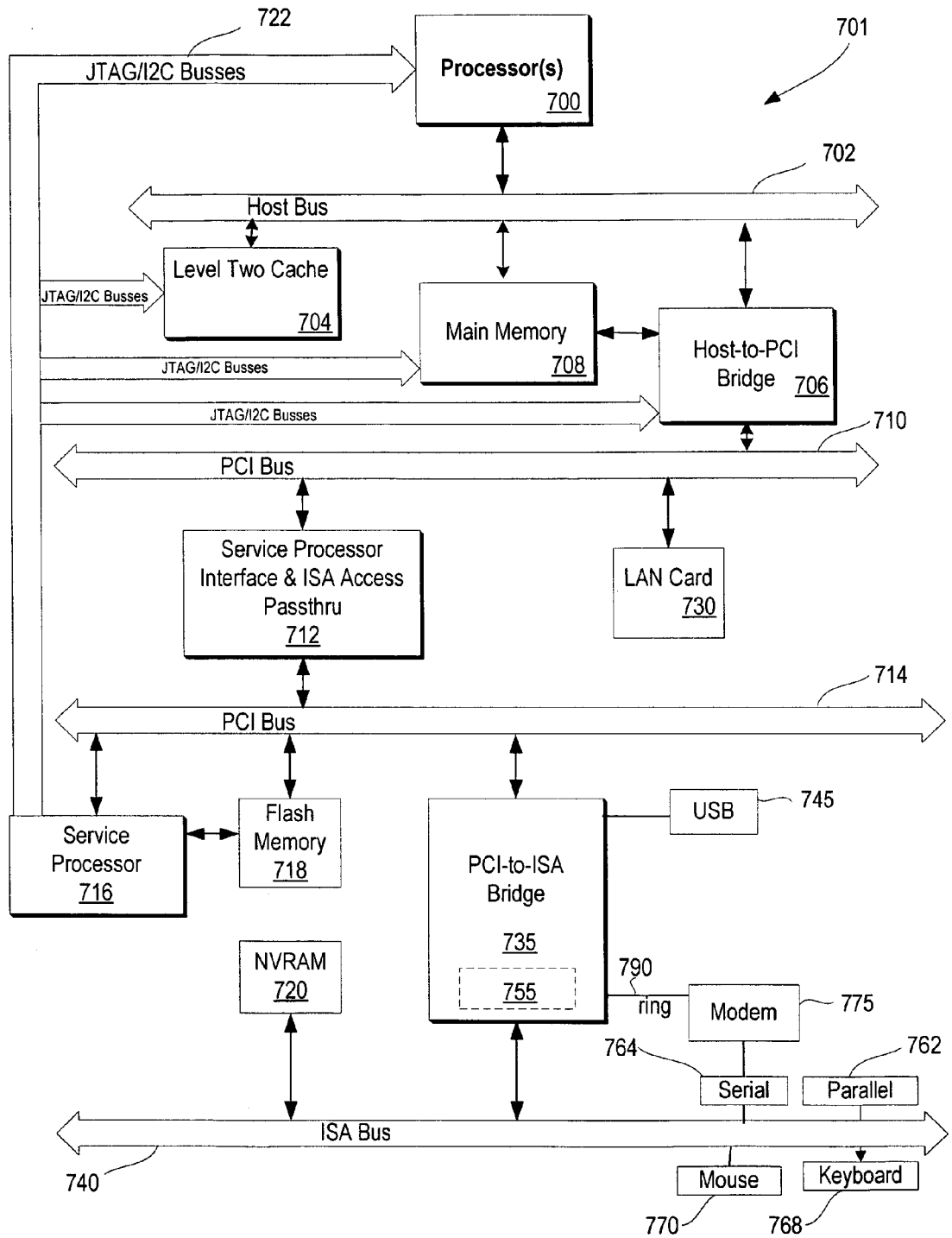
FIG. 7 is another block diagram of a computing device capable of implementing the present invention.

FIG. 7 illustrates information handling system 701, which is a simplified example of a computer system capable of performing the computing operations described herein. Information handling system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIGS. 6 and 7 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   detecting a stall condition within a pipeline stage from a plurality of pipeline stages, wherein the pipeline stage includes a first register, a second register, a first fill detector, and a second fill detector, the first fill detector controlling the first register and the second fill detector controlling the second register;
   activating a stall signal to the first fill detector in response to detecting the stall condition;
   in response to receiving the activated stall signal, waiting until the first register includes a first instruction and gating off a first clock to the first register using the first fill detector once the first register includes the first instruction;
   after gating off the first clock, sending a first register loaded signal from the first fill detector to the second fill detector; and
   in response to receiving the first register loaded signal, waiting until the second register includes a second instruction and gating off a second clock to the second register using the second fill detector once the second register includes the second instruction.

2. The method of claim 1 further comprising:
   detecting a downstream stall condition in a downstream pipeline stage that is included in the plurality of pipeline stages; and activating the stall signal in response to detecting the downstream stall condition.

3. The method of claim 2 further comprising: determining that the downstream stall condition has concluded; and deactivating the stall signal in response to the determination.

4. The method of claim 1 further comprising:
   propagating the stall signal to an upstream pipeline stage that is included in the plurality of pipeline stages; and
   wherein the propagation results in the upstream pipeline stage gating off an upstream pipeline stage clock to one or more registers included in the upstream pipeline stage.

5. The method of claim 1 wherein the stall condition is selected from the group consisting of an ERAT miss, a cache miss, a data dependency, and a non-pipeline instruction.

6. The method of claim 1 wherein a downstream pipeline stage included in the plurality of pipeline stages is not gating off a downstream pipeline stage clock to its corresponding registers while the pipeline stage is gating off the first clock and the second clock to the first register and the second register, respectively.

7. The method of claim 1 further comprising:
   wherein the method is performed using a broadband processor architecture, the broadband processor architecture including a plurality of heterogeneous processors, a common memory, and a common bus; and
   wherein the plurality of heterogeneous processors use different instruction sets and share the common memory and the common bus.

* * * * *